United States Patent
Memon et al.

(10) Patent No.: US 10,802,871 B1
(45) Date of Patent: Oct. 13, 2020

(54) INTELLIGENT COPROCESSOR STATE VIRTUALIZATION

(71) Applicant: Bitfusion.io, Inc., Austin, TX (US)

(72) Inventors: Mazhar Memon, Austin, TX (US); Miha Čančula, Ljubljana (SI)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/404,770

(22) Filed: May 7, 2019

(51) Int. Cl.
*G06F 9/46* (2006.01)
*G06F 9/48* (2006.01)
*G06F 9/455* (2018.01)
*G06F 9/50* (2006.01)

(52) U.S. Cl.
CPC ............ *G06F 9/4856* (2013.01); *G06F 9/455* (2013.01); *G06F 9/4881* (2013.01); *G06F 9/5088* (2013.01); *G06F 2209/483* (2013.01)

(58) Field of Classification Search
None
See application file for complete search history.

*Primary Examiner* — Gregory A Kessler
(74) *Attorney, Agent, or Firm* — Kim & Stewart LLP

(57) ABSTRACT

Instructions of at least one application are executed via system software, on a hardware computing system that includes at least one processor and a plurality of coprocessors. At least one application program interface (API) is associated with each coprocessor. A state virtualization layer is installed logically between the application and the system software. The state virtualization layer examines an execution stream directed by the at least one application to a first one of the plurality of coprocessors; extracts the state of the first coprocessor; pauses execution of the first coprocessor; and at runtime, dynamically resumes execution of the execution stream, with the extracted state of the first coprocessor, on a second one of the plurality of coprocessors.

19 Claims, 3 Drawing Sheets

INTELLIGENT COPROCESSOR STATE VIRTUALIZATION

FIELD OF THE INVENTION

This invention relates to computing systems that include co-processors.

BACKGROUND

As both the extent and complexity of computer processing have grown even in everyday modern life, there is a well-known, ever-increasing need for greater processing power. In many cases, even the increase in processing capability predicted by Moore's Law is insufficient.

One approach to handling some such tasks is "parallel computing", in which a task is decomposed into discrete sub-tasks that can be performed simultaneously by different processing systems. Certain processing tasks involve operations that can be performed by a system's main processor, but that are so specialized that an auxiliary processor—a coprocessor—may instead be more efficient, thereby leaving the more general operations to the main processor. A coprocessor thus often allows a processor to perform certain tasks more quickly and efficiently by offloading work to more specialized hardware, using some special purpose interfaces for sending work to, and retrieving results from, the coprocessor. Coprocessors are thus frequently included in systems to perform such operations as floating point arithmetic, encryption, string processing, I/O interfacing, signal and graphics processing, and chips for training artificial intelligence routines. Such coprocessors may be locally and/or remotely attached.

Coprocessors commonly execute either synchronously or asynchronously. A synchronous processor suspends the mainline processor's execution while the coprocessor runs. An asynchronous coprocessor, on the other hand, allows the mainline processor and the coprocessor to execute concurrently, typically by providing specific interfaces for moving work between the mainline processor and the coprocessor, and for indicating work status. What is needed, however, is a mechanism that enables "migration" of operations from one coprocessor to another, which may even be located on a different hosting server.

DETAILED DESCRIPTION

In broad terms, embodiments provide a state virtualization layer (SVL) that enables suspension, resumption, and migration of coprocessor computations from one coprocessor to another. In some embodiments, the coprocessors may even reside on different servers. Embodiments may be directed primarily to coordinating requests for coprocessor resources by applications, with various mechanisms being carried out server-side, that is, within the server(s) that hosts the coprocessors. For inter-server computation migration, embodiments include a coordination mechanism with clients so as to provide an automatic, substantially "glitchless" migration of network connections.

The ability to virtualize state that embodiments of the invention provide leads to a novel capability to dynamically manage, migrate, replicate, throttle, and secure computation dynamically at runtime. Although concepts described here may be applied in other contexts as well, embodiments are described here with application primarily to non-CPU compute devices (typically in a "coprocessor" or "slave" configuration), whereby the state virtualization layer is introduced in a non-privileged execution context (ring 3) in the context of running applications.

Figure 1:
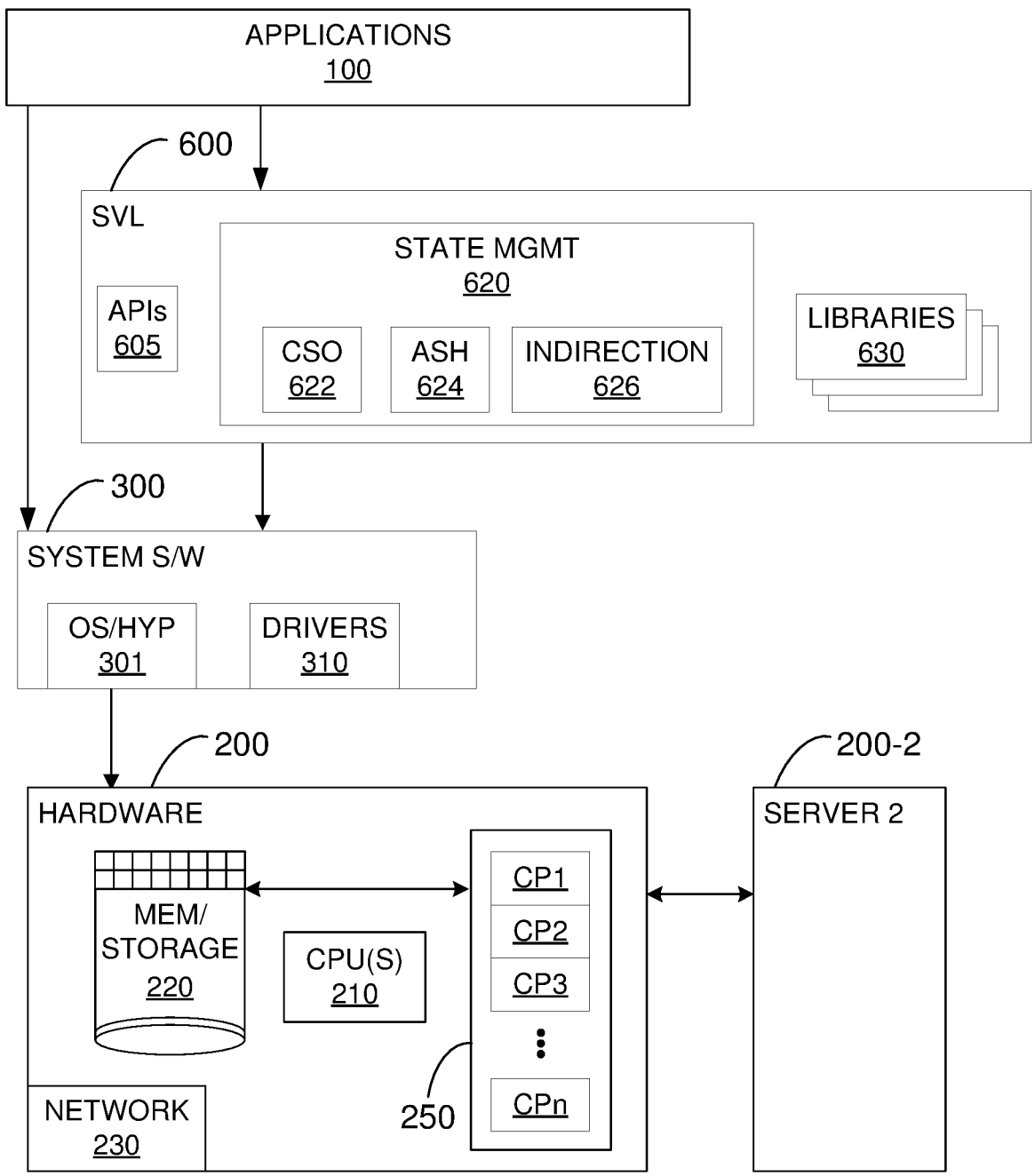
FIG. 1 illustrates, in a simplified form, the main components of a system that uses coprocessors and includes a State Virtualization Layer (SVL).

FIG. 1 illustrates one example of a hardware/software stack in which applications 100 run on a host hardware platform 200 (a "server"), typically under the control of a system software layer 300 such as an operating system (OS) and/or hypervisor 301 (in the case where virtual machines are being run). The software layer 300 will typically include drivers 310 that control communication with respective peripheral devices. In addition to other standard components, the hardware platform will include one or more general processors 210, volatile and usually non-volatile (such as RAM, SSD, disk, etc.) memory and storage components 220, as well as components for communicating with other systems over a network and other peripherals as needed, for example, network interface components 230. The applications may interact with the server via a network, either internal or external to the server itself.

As is well understood, both user-level applications and system-level software processes are generally embodied as computer-executable code that is stored in memory/storage 220, in a device's dedicated storage/memory, etc., and that is then loaded into the appropriate to the processor(s) or coprocessors for execution. Some instructions, however, especially for specialized devices such as coprocessors, may also be permanently and/or temporarily stored in the devices themselves. In particular, the code comprising an execution kernel for a coprocessor may be loaded into internal memory of the coprocessor itself, or the coprocessor may share memory with the host processor.

In many modern computing environments, the application layer 100 includes, and sometimes is even totally comprised of, one or more virtual machines (not shown), in which case the system software 200 may include a system-level virtualization component such as a hypervisor (illustrated as part of the component 301), which acts as the virtual-to-physical interface. In some systems, the hypervisor is co-resident with the host OS, with both operating in a privileged mode; in other systems, the host OS intermediates some or all hypervisor commands to the hardware; in still other systems the hypervisor replaces the host OS altogether; and in systems without virtualized components such as VMs, no hypervisor may be needed and included at all. Embodiments of this invention do not presuppose VMs, although they may operate with VMs as with any other applications that call coprocessors; moreover, system programmers will be able to adapt embodiments to different host OS/hypervisor configurations, including those with no separate host OS at all.

The hardware platform 200 includes a set 250 of coprocessors CP1, CP2, CP3, . . . , CPn. The coprocessors 250 may be installed within a common hardware platform, but this is not always the case and is not required by embodiments. For example, some or all of the coprocessors could be located within other systems, accessible via any standard buses or networks, such that the concept of "hardware platform" may be broadened to include such "peripheral" or even remote coprocessors, such as coprocessors in cloud computing environments. In FIG. 1, for example, the server that includes the hardware platform 200 may communicate with other servers, such as server 200-2, which includes its own set of coprocessors (not shown) and hardware and software components similar to those found in the system 200. Embodiments may also be used in other forms of distributed systems, such as a software-defined infrastructure (SDI). The applications 100 may also be running in a distributed processing environment, with more than one server handling processing tasks.

In the illustrated embodiment, an intermediate, interception "layer" 600, functioning as the SVL entity, is installed in any known manner and resides logically between the applications 100 and the coprocessors. In the illustrated embodiment, the layer 600 resides in a non-privileged, user space, between the applications and the system software 300, without need for modification of the application or of kernel-level software running on the hardware platform. Security and data confidentiality may thereby be enforced without compromising the system with additional privileged code. Furthermore, unlike other approaches, additional features can be introduced into the SVL without having to change the underlying operating system, drivers, or virtual machine hypervisors. This configuration also leads to other advantages such as ease of installation and use, portability, universality, and convenience, other configurations are possible. System designers may also choose, however, to install the SVL at the privileged level, and even into system software. It would also be possible to implement embodiments of this invention in hardware, in particular for specialized and well-defined computing tasks.

Furthermore, the SVL may be implemented so as to interface directly with applications 100 (as shown), or it may be configured to cooperate with and receive information from some more general virtualization and control layer (if included), which might, for example, include components that perform such tasks as memory profiling, general resource managers, encryption, memory protection, keeping track of and managing the distribution and pooling of the coprocessors in general (including determining which coprocessors an application may use), or of provisioning of the overall set of available memory resources.

Coprocessors typically have a "master-slave" relationship relative to the normal host CPU(s) 210 that runs the applications—an application is typically run on the host CPU(s) while certain computational tasks are offloaded to coprocessors for increased performance. Compute APIs (Application Program Interfaces), that is, APIs that are used by applications to leverage coprocessors, typically have explicit functions to offload computation and make host data available to the coprocessor, or vice-versa.

The API for each coprocessor, accessible by the overall system, is known and exposed to the applications that may wish to use it. Some of these APIs will be open, that is, public, whereas others may be customized for certain coprocessors. Even in the case of customized APIs, however, these will be known to all applications that may need to use the corresponding coprocessor. Since the coprocessors available at any given time are known to the system, their APIs are also known and applications 100 are programmed to properly format API calls to the coprocessors they wish to use. Note that a coprocessor is not necessarily limited to one API alone; rather, modern coprocessors, for example, common CPUs, can support any number of APIs, which do not have to be identical.

Applications generally include various core functions, such as the routines needed to communicate processing requests to the operating system, to access the file system, allocate memory, and access common functional libraries for operations such as data compression, image manipulation, accelerated math functions, etc. Compute APIs, specifically, deal with the management of coprocessors, and execution and data flow, to make full and efficient use of the coprocessors. This includes dispatching data and compiled compute routines, returning status information, and synchronizing streams of execution between the coprocessors and other coprocessors, and the coprocessors and the host system.

Relevant in the context of embodiments of this invention is that parameters specifying not only which coprocessor(s) an application wishes to call, but also the instruction stream(s) to be executed on desired coprocessor(s) are available for inspection and analysis by the SVL, since such instructions will be stored in identifiable portions of memory/storage. In addition, parameters specifying such other call-related requirements as required memory can be read or determined, since they are generally included in the corresponding API call issued by an application. As is well known, an API comprises routines and protocols that specify how software components should interact, how a software component such as an application may interact with a hardware component, etc. Note that, whereas different vendors may provide different coprocessors, the corresponding APIs may themselves be either vendor-specific or generic.

OpenCL (Open Computing Language—OCL) is a well-known and widely used language for cross-platform, parallel programming of diverse processors. OpenCL is often used, for example, in APIs. Various features of embodiments of the invention, in particular, APIs, coprocessor kernels and libraries, may therefore be implemented according to OpenCL specifications. This is just one design choice, however, and skilled programmers will know how to use any other parallel processing language or paradigm to implement these software components. Examples of such alternatives include CUDA, SQL, MPI, OpenMP, and OpenACC.

Some prototypes of embodiments of this invention, for example, were developed using NVIDIA graphics processing units (GPUs) as the coprocessors, as well as NVIDIA CUDA GPU drivers. (CUDA is a well-known parallel computing platform and API developed by and for NVIDIA GPUs.) Merely by way of example, and without limitation, various features of embodiments of the invention may therefore be described below in terms (such as some commands) of OpenCL and/or CUDA. As mentioned above, however, skilled developers will know how to implementation these features using other languages or formats. As just some examples, implementations may have coprocessors such as Artificial Intelligence Application-Specific Integrated Circuits (AI ASICS), Field-Programmable Gate Arrays (FPGA)s, Digital Signal Processors (DSPs), etc., which have their own respective programming languages/instruction sets and syntaxes.

CUDA and OpenCL can be classified as "compute APIs" which are targeted for compute engines that are usually (but not always) discrete and have a master-slave relationship to the normal CPU cores running the application (host code). Typically, applications are split between host code (run on CPU cores) and device code (run on the coprocessor). The compute API has explicit declaration and initialization of all aspects of execution including: buffer, device, memory, context, stream (thread), and event management. Even though the trend towards unified addressing relaxes the explicit nature of compute APIs, they still typically adhere and mainly support a master-slave hardware relationship between the host and device.

Depending on the execution model embodiments of the invention are implemented in, it may also be possible for them to run across different APIs concurrently: Embodiments of this invention are general to compute APIs, or to any APIs that can be intercepted at the application level (as in library interposing), such that more than one API may be executed simultaneously. This allows for several, possibly many, different coprocessor types and instances to be virtually attached to the application and still enjoy the advantages of the invention.

In systems that use NVIDIA GPUs, the CUDA drivers typically reside either in the system software layer, or in a separate intermediate layer between applications and other system software, such as in the SVL layer 600. Regardless of which language and format are used, embodiments, in particular the SVL layer 600, are thus able to intercept a stream of API calls from applications and from the thus captured information determine which coprocessor each call is directed to.

In a standard OCL stack, characteristics of available coprocessors, including which devices these are, are available from OCL libraries, which may be included in the host platform or the devices themselves. An application may then use standard OpenCL calls through respective vendor Installable Client Drivers (ICDs) to create a standardization and abstraction layer for the application-specific libraries. As part of the call, the application will typically indicate any required execution parameters, as well as various inputs, which may include any type of value. The call may then pass to the designated target coprocessor, which may then run to complete the task.

SVL as Virtualized Coprocessor

Typical coprocessors are currently static and have an immovable execute state: Applications cannot migrate from one coprocessor to another without completely shutting down and restarting. The state virtualization feature of embodiments of this invention provide the capability to dynamically manage, migrate, replicate, throttle, and secure computation dynamically at runtime. By way of example only, embodiments are described in the context of introduction of this capability for non-CPU compute devices (typically in a "coprocessor" or "slave" configuration) in a non-privileged execution context (ring 3), further in the context of running applications.

As will become clearer from the following description, one of the benefits of introducing state virtualization to coprocessors such as GPUs is the ability to dynamically move execution from one device to another. This is especially useful for migration and load balancing. Migration may involve, for example, moving execution from one (faulty) device (detected in any conventional manner) to another (good) device, for moving from one faulty server to another to do maintenance, etc. Load balancing may involve, as one example, moving from an oversubscribed device to a more idle one, which may take place every at level, that is, at the level of an individual execution context (thread), device, server, etc. Another benefit is that embodiments enable automatic compression and scaling out, for example, when some coprocessors are idle; this in turn allows for more efficient use of the available coprocessor resource.

In broad terms, the SVL 600 examines execution streams, in particular, API calls, from one or more entities (such as applications 100, different processes within a single application, etc.) and, based on captured coprocessor state, and transparent to the client, determines whether all or part of the stream execution should be migrated to a different coprocessor than the one the application has called, or on which the stream may already be running. To accomplish this, the SVL 600 intercepts processor/coprocessor work coordination interfaces and may manipulate work-coordination primitives between any of the main processor(s) 210 and the coprocessor resources.

In the illustrated embodiment, the SVL 600 includes the code defining APIs 605, in particular, the APIs used to call the coprocessors. These APIs may be open, that is, public, whereas others may be customized for certain coprocessors. Even in the case of customized APIs, however, these will be known to the applications that may need to use the corresponding coprocessor. Since the coprocessors available at any given time are known to the system, their APIs are also known. As is known, applications 100 are programmed to properly format API calls to the coprocessors they wish to use and in many cases, the APIs that each application will call into may also be known in advance.

For many tasks often assigned to coprocessors, there may be one or more functions that are carried out so often, or are so specialized, that it is common to implement them in code in a way that is easy for different applications or processes to invoke, once or repetitively. Different programming languages may refer to these code modules as "subroutines", "subprograms", "functions", "methods", etc. Prototypes of embodiments of the invention were written in OpenCL, for example. In many cases, the code modules that implement these functions are made available in or accessible as "libraries" 630, which thus may provide various sets of functionality. Libraries may be open and/or custom and may include various existing system libraries. Libraries may be provided by device vendors, or by vendors of libraries themselves (such as mathematics library packages), or written by users themselves, such as for highly specialized and less common types of calculations. As just two of a substantially limitless number of examples, libraries exist in many different programming languages to perform matrix operations fast, or to numerically solve certain differential equations, etc.

Embodiments of this invention do not presuppose that the code stored to embody a library, that is, to perform some process, is necessarily a sub-routine, that is, some smaller part of a larger body of code; rather, libraries provided for different tasks could include entire applications as well. In other words, the difference between a sub-routine or an application is, in the context of this invention, mostly insubstantial, semantic, and non-limiting.

In the illustrated example, which reflects prototypes, OpenCL libraries are assumed, although this is not a necessary assumption in general—other implementations may not involve OpenCL at all. An OpenCL library typically has two components: a host component, which is usually (but not necessarily) general and often device-independent, and a device component, which is typically more specific to a given hardware vendor. For example, the code that defines the computational steps to invert a matrix may be the same regardless of which device is to carry out those computational steps, but different coprocessors that might be called to carry out the steps may have different input formats or floating-point number conventions. The libraries 630 may be implemented using any chosen data structure and may be stored in, for example, system memory 220; they are shown within the SVL 600 to illustrate their functional use by the SVL. One or more of the libraries may instead be located within devices themselves, or within components of the system software, within applications, or even remotely, such as in a remote vendor or other server. As with other code, however, when it is time to execute the code in a library, it will be loaded into some high-speed memory component directly accessible by the processor(s) 210 or coprocessors 250.

The mechanism by which the SVL 600 may intercept an execution request will generally be coprocessor-specific, but will be within the skill of systems programmers once the coprocessor is specified. An API call from an application may, for example, indicate an execution request.

The functionality of different SVL embodiments may be viewed as being of different types, in increasing order of complexity and capability, but all of which are implemented on the server side, that is, within the server that includes the coprocessors. Here, "process" is a server process, and "machine" is a server, etc. Five functionality types I-V include:

Type I: Pause and resume execution within a single process, retaining coprocessor memory. In this case, a coprocessor's execution is paused and resumed on the same coprocessor(s), keeping the coprocessor memory resident.

Type II: Pause and resume on a single machine within a single process, temporarily swapping all coprocessor memory to the host. This is the same case as I except that instead of keeping the coprocessor resident, it is swapped out upon "pause" and swapped back upon "resume".

Type III: Pause and resume on a single machine within a single process but to different coprocessors. The SVL, for example, using a state management component 620, then captures all coprocessor state upon "pause". Coprocessor state includes at least:
  a. Coprocessor memory
  b. Stream objects and association devices. Note that coprocessor "streams" are analogous to "threads" on cores.
  c. Execution contexts associated with CPU threads and coprocessor streams. Note that coprocessor "contexts" are analogous to CPU statistics, which include such things as a program counter, registers, etc.
  d. Events and associated streams, used for synchronization and coordination among coprocessor streams
  e. Code modules (executables loaded) and associated handles This allows for the useful ability to pause on one coprocessor and resume on another. Broadly, a coprocessor "boundary" is the point in execution at which it is possible and safe to completely capture state. This happens, for example, at synchronization boundaries like calls to cuCtxSynchronize. Boundaries are thus, substantially, barriers defined in the API. At an execution boundary, the coprocessor state objects (above) may be snapshotted if a "pause" has been requested and the coprocessor can safely be quiesced. Upon "resume" the state objects may be reinstated. This embodiment is thus advantageous for load balancing and migration away from marginal coprocessors, as well as other similar use cases.

Type IV: Pause and resume on a single machine and migrate between processes. In addition to coprocessor state (in type III), other state associated with the CUDA/compute API may also have to be captured. API state includes handles, which act as reference objects or opaque pointers to refer to an object. These will be part of the "state" in a client application, the client's view of which should be maintained through pause, migration, and resumption operations for:
  a. Stream Handles
  b. Contexts
  c. Events
  d. Code Modules Coprocessor handles and, depending on API, memory addresses, may need to be serialized into an offline state, which may be done on the server side, under the direction of the SVL. The application may be paused while the server-side state is captured, the server process is killed, and a new server process is started that loads the captured state, connection is reestablished, and the application may continue.

Type V: Pause and resume on a different machine. In addition to the tasks outlined in Type IV, to perform migration from one server system to another, the network connectivity that existed between the client system and the first server system (200) is migrated to a second system (200-2).

For the sake of simplicity, the following description will focus on the embodiment corresponding to Type IV, since this will capture the core concepts of other types as well.

At a high level, the SVL needs to manage two major groups of state during pause, migrate, and resume operations: coprocessor state objects, and API state handles. FIG. 1 shows a state management module 650 within the SVL to capture and manage coprocessor state. State capture may be implemented either client-side or server-side. Implementation on the client will, however, in many cases be a simpler implementation, because it allows state to be moved/managed across all connected servers without having to deal with failing servers, or migrating state to another server during migration.

Figure 3:
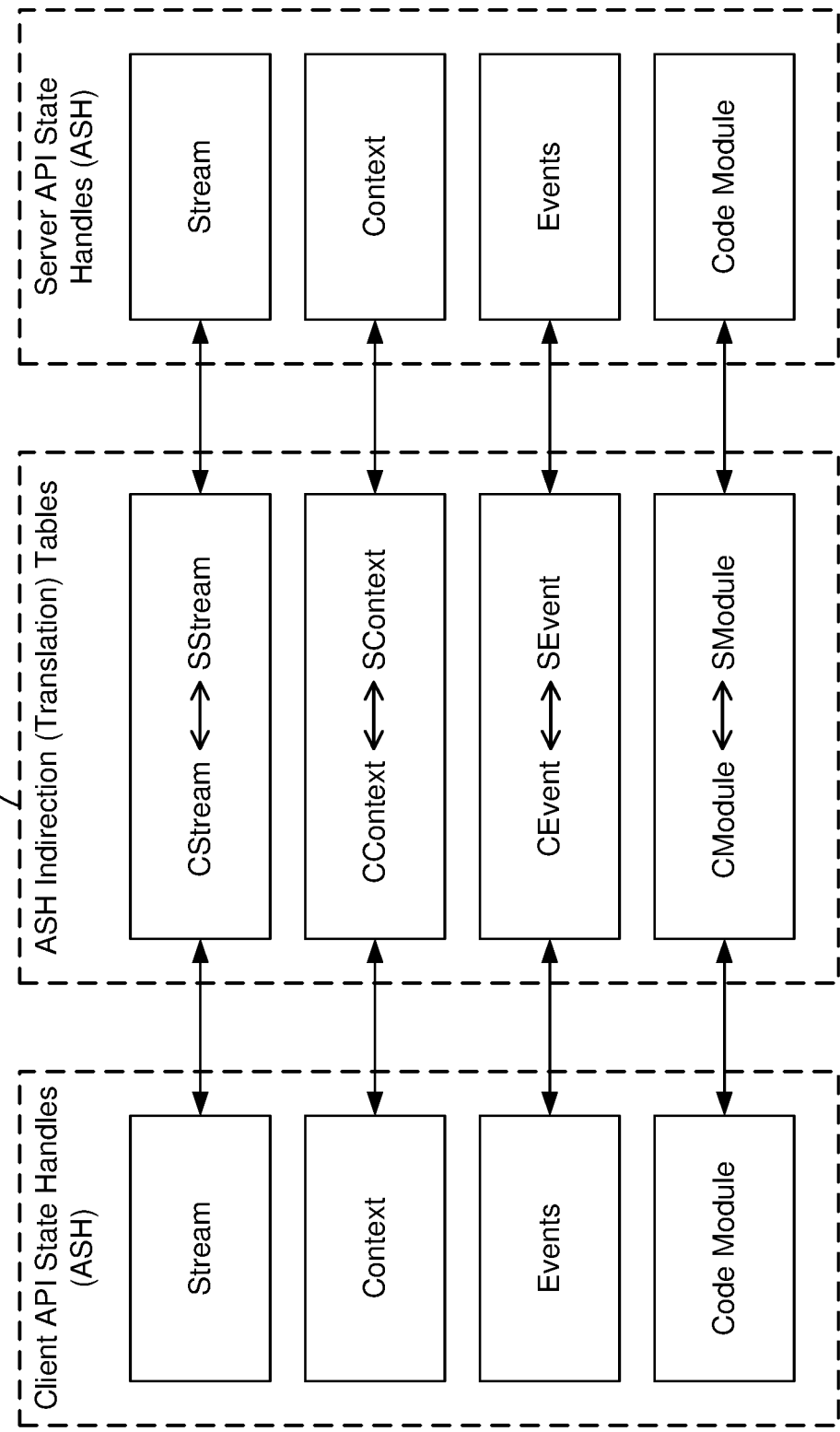
FIG. 3 illustrates application state handles.

Coprocessor State Objects (CSOs) need to be captured, stored, and reinstated, for example, by a CSO component 622 in the SVL, and API state handles (ASHs) may use an indirection/translation table (shown as component 624) that maps the static client values to dynamic server values. (This mapping of, for example, stream, context, event, and code module state handles between the client and server contexts is illustrated in FIG. 3.) CSOs and ASHs may be handled in different ways through pause, migrate, and resume operations:

Pause

Figure 2:
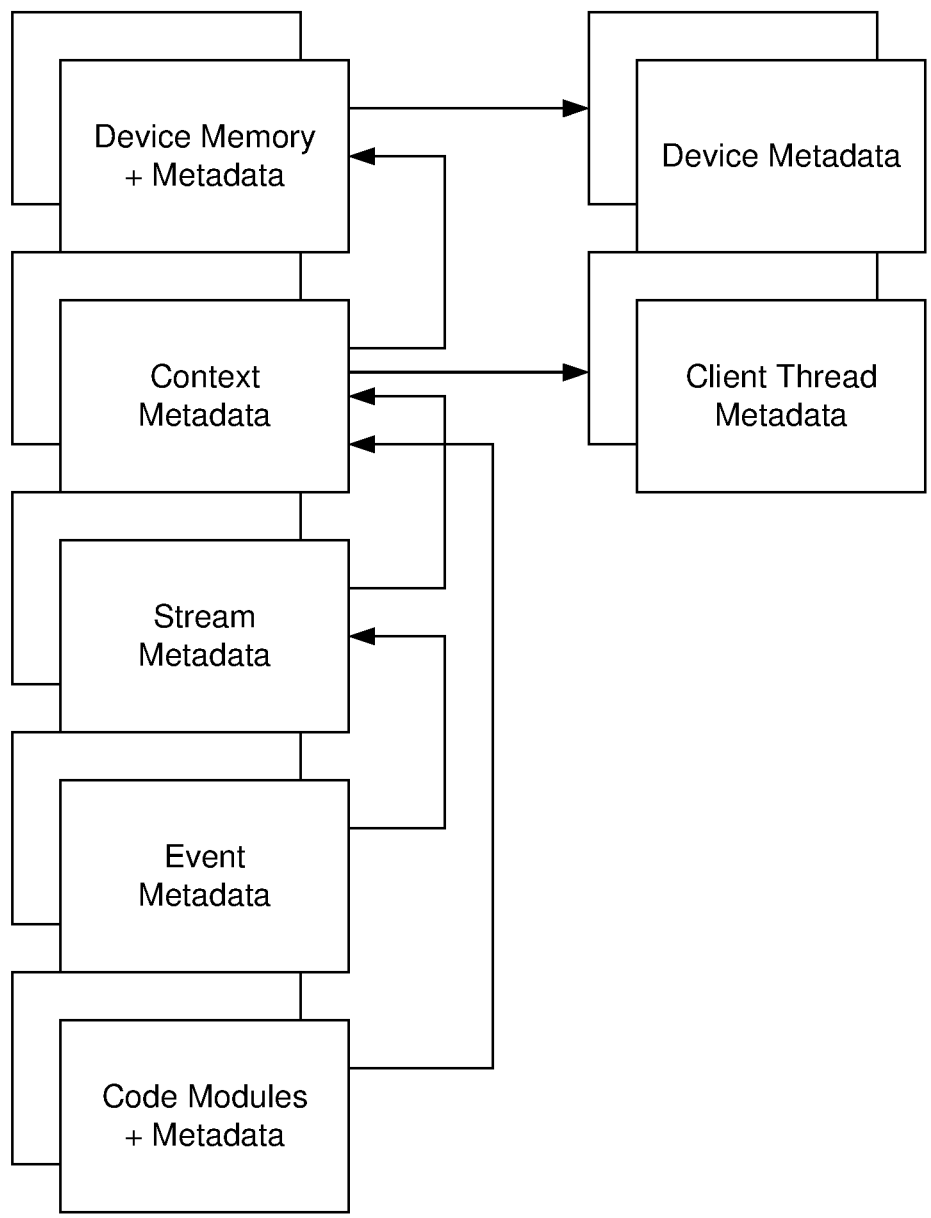
FIG. 2 illustrates coprocessor state objects and various relationships between them.

During a pause operation, CSOs are captured (for example, by component 622) and saved in either an offline state (to disk) or to host memory. For each coprocessor CSO, references to other resources and CSOs are traced, which may be done using known techniques. FIG. 2 illustrates different CSO objects and relationships. In particular, FIG. 2 illustrates relationships between Device Memory, Context, (execution) Stream, Event, and Code Module metadata and their relationship with each other and with metadata of Devices and Client Threads. CSOs will typically also have additional metadata that may be used to reconstruct the CSO upon resumption. This metadata typically includes, but is not limited to: API flags used to instantiate the CSO that affect behavior; a set of associations to other CSO types; and size information.

An "Event", is a typically concept within the API itself. As one example, a CUDA event is used to trigger or notify a waiting stream/thread when some operation is completed. This allows the programmer to chain multiple operations together without having to poll for status, thus, Task 2 can start when Task 1 completes, and so on.

In FIG. 2, which, by way of example only, illustrates an embodiment in a CUDA context, two CSO types are shown that have actual data apart from metadata: device memory snapshots and code modules. The other CSO types may thus be completely reconstructed by the information contained in metadata.

In order to capture metadata for each CSO, the SVL 600 tracks the creation, usage, and tearing down of all CSO types so that each CSO may be reconstructed exactly. This mainly includes API flags and options as the CSO is created as well as associations gleaned by API calls. For example, CUresult cuModuleLoad( . . . ) creates a new CSO (Code Module) and an association: the module is loaded into the current running context (Module→Context association).

Once all CSOs are captured, each CSO may be destroyed and deallocated by using the facilities within the API such as (again, in the example CUDA context) cuCtxDestroy, cuModuleUnload, etc.

Migration

In order to migrate computation from one coprocessor to another, the SVL should ensure that 1) the client/application view of the API states (as accessed through ASHs) is unchanging; and 2) the underlying physical hardware 200 and CSOs can be changed. As FIG. 3 illustrates, these steps may be accomplished by introducing an indirection table (shown as component 626) that translates the static client ASHs to dynamic server ASHs. The ASH is set up as new resources are allocated. For example, when a context is allocated, it allocates the server version of that and populates the ASH. ASHs may reside on either the client or the server (for example, as a cache). Consequently, whenever work is dispatched from a client (application) to the server (200) a translation of the client ASH is performed and when work is referenced from the server to the client the opposite translation may occur. At dispatch time, this can be done on the client; however, the server can also have the ASH and do the translation itself prior to executing the API call. Since the SVL 600 is interposed between applications and coprocessor(s), this indirection may performed naturally.

Resume

A resume operation may be performed by first reversing the "Pause" step: reallocate all CSOs according to captured metadata. For example: cuStreamCreate ( . . . , unsigned int_Flags) creates a new stream. When each CSO is created, it will generate new ASHs (for example, stream handles) and thus the ASH indirection table 626 may be updated so that the associated client ASH maps to the new server ASH.

Migration and resumption may happen at any level: device (coprocessor), server process, or physical machine.

There are several differences between the migration of coprocessor execution performed by the SVL and conventional virtual machine (VM) migration. VM migration involves state capture of CPU memory, whereas the SVL captures state from APIs and migrates those from device memory. CPU memory management involves virtual memory, which coprocessors such as GPUs generally do not have at all. The SVL therefore captures state explicitly from API streams. This enables partial state migration (thus a portion of coprocessor load can be migrated to a different coprocessor), whereas VM migration requires migration as a whole. Coprocessor migration using the invention may therefore be more fine-grained, not only with respect to how much state is migrated, but also temporally, such as second-per-second (or other time unit) migration.

As FIG. 1 shows, and as is explained above, the SVL 600 is preferably an interception layer interposed between applications and the coprocessors. In addition to the advantages mentioned above, this also conveniently enables such operations as bin-packing, moving coprocessors with the same client closer to that client, defragmentation, splitting of workload from one coprocessor to another, coprocessor RAID, such as mirroring and striping of coprocessors, and state "mix-and-match": if what is running on one coprocessor is complementary with that running on another coprocessor, the execution streams may be routed to the same coprocessor.

Implementation Examples

Refer to the summary of the different "types" I-V of embodiments above.

Type I

To implement Type I, the SVL may stall all API calls to ensure that the currently scheduled asynchronous calls have been completed. CUDA, for example, includes an almost-global cuCtxSynchronize( ). If the SVL, or some other interposed software layer (of which SVL could be a part), is configured to track all CUDA streams and OpenCL queues, then the SVL may synchronize each stream individually.

Consideration may need to be made for out-of-order execution, as dependent operations may need to be "synchronized" or flushed in order to make their side effects visible before being able to move or alter state. If the network over which the SVL receives signals from applications is fast enough, however, behavior may not need to be asynchronous at all, which will make all native API calls in the same order as client API calls.

In type I, the SVL should be configured to decide how to trigger a pause-and-resume operation. Use of a user-defined signal and an indication file is one option. The implementation for type I may comprise blocking all API calls after a certain point, which may, for example, be a timestamp, or the moment an indication file is detected, waiting for existing calls to finish, and then creating another indication file to inform the SVL that the program is paused. Unpausing may be accomplished by releasing the stalls on API calls.

Type II

Relative to Type I operation, Type II operation adds only swapping out of all data in coprocessor buffers when pausing, and swapping this data back in when unpausing. This may be done using known mechanisms.

Type III

In addition to memory buffers, in this operational embodiment, the SVL keeps track of all API-specific handles and their relationships. In CUDA, as just one practical example, the main handles are CUcontext and CUdeviceptr. Swapping device pointers may also be included in Type II operations, but in Type III these pointers may be associated with a CUcontext.

Other CUDA handles include CUstream, CUevent, CUmodule, CUfunction, CUtexref, CUarray. which should be associated with a context. The association is preferably two-way, so that each handle has a pointer to its context, but a context may also be provided with a list of all its handles.

Recreating handles, even in the same process, requires tracking of everything the SVL sends the respective client. One example of a structure used to accomplish this in a prototype is as follows:

```
void createCSO (csoHandle *argx)
{
  csoHandle x; // handles are typedefs to pointers, so
      csoHandle is itself a pointer type, something like 'cso-
      Struct *'
  native_createObject (&x);
  csoHandle wrapper=allocateMapping (x)
  *argx=wrapper;
}
```

In this prototype, a generic allocateMapping( )function was called, its contents were set, and a new handle was returned. To get the real handle to pass into the native call (i.e. vendor implementation), a routine such as the following getMapping( ) may, for example, be used:

```
void useCSO (csoHandle argx)
{
  csoHandle real_handle=getMapping (argx)
  native_useObject (real_handle);
}
```

The parameters x_wrapper and its "x" field may be stored in any chosen component, including in the calling application itself. To support recreating state in a different server process, the system should update all the "x" fields to point to the newly created handles. The created handle wrappers should therefore be stored and update\when the state has been recreated.

Type IV

To implement this type, the client application is paused, although still active, and the state of the server is serialized and deserialized. The control connection between the client and the system's dispatcher may continue to run, which provides information to the SVL about when the client should connect to the new server.

To handle wrappers, a global list of connections may be created and stored within any component accessible to the SVL. In this implementation, only the server part is in a new process, whereas the client side is the same process, so all returned allocated handle wrappers will still point to valid memory locations, even though the actual handles have to be updated.

Type V

At the level of APIs, Type V may operation the same as Type IV; however, the SVL will reconnect the paused application to a different server than the one that previously hosted the coprocessors that were executing streams issued by the application.

Example Advantages and Use Cases

Several advantages of different embodiments of the invention are mentioned above, as well as several use cases. At a high level, the embodiments provide a foundational capability that allows for the dynamic pausing, migration, and resumption of computation on a coprocessor. This capability can be used for a wide range of use cases to improve the efficiency, performance, and resiliency of accelerated workloads. Some of those and other advantages and use cases includes, by way of non-exhaustive example:

1) A scheduler that can dynamically migrate running jobs from one server to another for the purposes of bad-balancing (an example of performance optimization) and/or server consolidation (an example of cost and power optimization);

2) Scheduling of workloads according to predefined service level agreements or quality of service (SLA/QoS) settings;

3) An ability to pre-empt running workloads with other higher priority ones;

4) Migration of workloads from one co-processor to another type with better or more optimal performance/power/cost characteristics for the workload, such as from a first-generation GPU to a second-generation GPU, or from a higher to a lower power cost GPU, or vice versa;

5) Used with any other known mechanism to predict coprocessor failures, a smart scheduler using an embodiment of the invention could migrate running workloads to other servers/coprocessors before the failure so as to avoid potential errors.

6) An ability to concurrently execute the same workload on other coprocessors and failing over in the event that one coprocessor abruptly fails.

7) An ability to expose to an application more (virtual) coprocessors than are physically present or that the system wishes to make available by scheduling the application's different workloads on the physical coprocessor(s). For example, a workload directed at, say, eight coprocessors could be time-sliced so as to run on a single (or at most <8) physical coprocessor.

8) Such more-to-fewer coprocessor "compression" could also be determined or statistically or heuristically. For example, if certain workloads are submitted repeatedly, or are otherwise known from real-time or off-line examination, the properties of how they execute may be analyzed, stored, and optimized for a minimal (or at least lesser) number of coprocessors with a chosen maximum amount of performance reduction.

What is claimed is:

1. A data processing method comprising:
    executing instructions of at least one application, via system software, on a hardware computing system that includes at least one processor and a plurality of coprocessors, at least one application program interface (API) being associated with each coprocessor;
    installing a state virtualization layer logically between the application and the system software, and, by said state virtualization layer:
        examining an execution stream directed by the at least one application to a first one of the plurality of coprocessors;
        extracting the state of the first coprocessor;
        pausing execution of the first coprocessor; and
        at runtime, dynamically resuming execution of the execution stream, with the extracted state of the first coprocessor, on a second one of the plurality of coprocessors.

2. The method of claim 1, further comprising installing the state virtualization layer in a non-privileged, user space, without modification of the application or of the system software running on the hardware computing system.

3. The method of claim 1, in which each coprocessor has memory and the hardware computing system on which the coprocessor runs has host memory, further comprising:
    carrying out the steps of pausing and resuming within a single process by, upon pausing, temporarily swapping out all first coprocessor memory to the host memory, and, upon resuming, swapping back the swapped-out first coprocessor memory from the host.

4. The method of claim 1, further comprising:
    extracting the state of the API currently associated with the first coprocessor;
    in conjunction with pausing execution of the first coprocessor, starting a second process within the same hardware computing system and loading both the extracted first coprocessor state and the extracted state of the API; and
    resuming execution via the second process but still running on the first coprocessor.

5. The method of claim 4, in which extracting the state of the API currently associated with the first coprocessor comprises extracting corresponding API state handles.

6. The method of claim 5, further comprising creating and, within the state virtualization layer, a translation table that maps static application-level state values to dynamic, host-level state values.

7. The method of claim 1, in which the hardware computing system comprises a plurality of hardware platforms that include respective ones of the plurality of coprocessors, said first and second coprocessors running on different hardware platforms.

8. The method of claim 1, further comprising:
    determining a priority of workloads directed to the coprocessors; and pre-empting execution of a relatively lower-priority workload on the first coprocessor and instead executing a relatively higher-priority workload on the first coprocessor.

9. The method of claim 1, further comprising:
determining preferred coprocessor characteristics for at least one workload directed to the coprocessors; and
migrating workloads from one of the plurality of coprocessor of a first type to a different one of the plurality of coprocessors of a second type having execution characteristics better corresponding to the preferred coprocessor characteristics.

10. The method of claim 1, further comprising predicting failure of the first coprocessor, pausing the execution of the first coprocessor, and resuming execution on the second coprocessor.

11. The method of claim 1, further comprising exposing to at least one of the applications more coprocessors that are physically present in the hardware computing system by repeatedly and alternately carrying out the steps of pausing and resuming execution on different coprocessors.

12. A data processing system comprising:
a hardware platform that includes at least one processor;
at least one application comprising computer-executable code executable on the at least one processor;
a plurality of coprocessors, each said application generating at least one execution stream for execution, under control of system software, on at least one of the plurality of coprocessors, at least one application program interface (API) being associated with each coprocessor;
a state virtualization layer installed logically between the application and the system software, said state virtualization layer being provided:
for examining an execution stream directed by the at least one application to a first one of the plurality of coprocessors;
for extracting the state of the first coprocessor;
for pausing execution of the first coprocessor; and
at runtime, for dynamically resuming execution of the execution stream, with the extracted state of the first coprocessor, on a second one of the plurality of coprocessors.

13. The system of claim 12, in which the state virtualization layer is in a non-privileged, user space, without modification of the application or of the system software running on the hardware platform.

14. The system of claim 12, in which each coprocessor has memory and the hardware platform on which the coprocessor is a host that has host memory, wherein the state virtualization layer installed is further provided for carrying out the steps of pausing and resuming within a single process by, upon pausing, for temporarily swapping out all first coprocessor memory to the host memory, and, upon resuming, swapping back the swapped-out first coprocessor memory from the host.

15. The system of claim 12, wherein the state virtualization layer is further provided:
for extracting the state of the API currently associated with the first coprocessor;
in conjunction with pausing execution of the first coprocessor, for starting a second process within the same computing system and loading both the extracted first coprocessor state and the extracted state of the API; and
for resuming execution via the second process but still running on the first coprocessor.

16. The system of claim 15, in which extracting the state of the API currently associated with the first coprocessor comprises extracting corresponding API state handles.

17. The system of claim 16, further comprising, within the state virtualization layer, a translation table that maps static application-level state values to dynamic, host-level state values.

18. The system of claim 12, comprising a plurality of hardware platforms that include respective ones of the plurality of coprocessors, said first and second coprocessors running on different hardware platforms.

19. A data processing method comprising:
executing instructions of at least one application, via system software, on a hardware computing system that includes at least one processor and a plurality of coprocessors, at least one application program interface (API) being associated with each coprocessor, wherein each coprocessor has memory and the hardware computing system on which the coprocessor runs has host memory;
installing a state virtualization layer logically between the application and the system software in a non-privileged, user space, without modification of the application or of the system software running on the hardware platform, and, by said state virtualization layer:
examining an execution stream directed by the at least one application to a first one of the plurality of coprocessors;
extracting the state of the first coprocessor and extracting the state of the API currently associated with the first coprocessor as well as extracting corresponding API state handles;
pausing execution of the first coprocessor; and
at runtime, dynamically resuming execution of the execution stream, with the extracted state of the first coprocessor, on a second one of the plurality of coprocessors;
creating and, within the state virtualization layer, a translation table that maps static application-level state values to dynamic, host-level state values;
carrying out the steps of pausing and resuming within a single process by, upon pausing, temporarily swapping out all first coprocessor memory to the host memory, and, upon resuming, swapping back the swapped-out first coprocessor memory from the host;
in conjunction with pausing execution of the first coprocessor, starting a second process within the same computing system and loading both the extracted first coprocessor state and the extracted state of the API; and
resuming execution via the second process but still running on the first coprocessor.

* * * * *